Feb. 1, 1944. J. H. SHIEBER 2,340,824
HOOK BOLT FOR RAILWAYS
Filed Sept. 17, 1941

INVENTOR.
Jacob H. Shieber
Roy M. Eilers
BY

Patented Feb. 1, 1944

2,340,824

UNITED STATES PATENT OFFICE 2,340,824

HOOK BOLT FOR RAILWAYS

Jacob H. Shieber, University City, Mo.

Application September 17, 1941, Serial No. 411,128

2 Claims. (Cl. 189—35)

This invention relates to improvements in equipment for railways. More particularly, the invention relates to improvements in hook bolts for railways.

It is an object of the present invention to provide an improved hook bolt for railways.

Ordinarily, the tracks of railways are secured to wooden ties that are embedded in a road bed. Where the tracks cross a bridge or trestle or similar structure, the tracks must be secured to the ties and the ties must be secured to the bridge or trestle. These ties are usually secured to the bridge or trestle by a hook bolt.

The hook bolt now in general use consists of a piece of metal having a long, cylindrical shank which is threaded at one end and forged into an L shape at the other end. The forged end of the hook bolt is substantially square in cross-section. Such a hook bolt is driven into the hole in each end of a tie. The bolt is driven into the wood until the square, forged end of the hook bolt extends about an inch into the tie. The diagonals of the squared end of the hook bolt are larger than the diameter of the hole in the tie, and the edges of the squared end of the bolt cut into the wood forming the hole. In assembling a hook bolt with a tie, the tie is placed on the structure, and the hook bolt is then driven into the tie. The bolt is driven into the tie in such a manner that the forged L-shaped portion of the hook bolt, fits under the flange of the girder of the bridge or under the cover plate attached to the girder. A washer and nut are then threaded onto the threaded end of the hook bolt and pulled up tight. The squared face of the forged end of the hook bolt, bears against the edge of the flange or the edge of the cover plate and keeps the tie in proper alignment. The holes in the ties are preferably spaced so the inner edges of the hook bolts bear against the outer faces of the flanges of the trestle. The hook bolts are then pressed tightly against the faces of the flanges and pulled up tight. The engagement between the faces of the flanges and the squared faces of the hook bolt, is supposed to prevent a skewing of the tie, and the engagement between the body portion of the bearing member and the under side of the flanges is supposed to secure the tie to the trestle. The edges of the forged portion of the hook bolt that cut into that portion of the tie that forms the circular hole, are supposed to keep the bolt from turning relative to the tie. In many cases the vibration imparted to the tie and the bridge or trestle by the passage of cars, sooner or later causes the hook bolt to turn relative to the tie. This turning is not very pronounced at first but it tends to increase as time goes on. The turning of the bolt in the hole acts to ream out a larger hole in which the bolt turns rather freely. In many cases the hole has been enlarged sufficiently to permit the hook bolt to turn quite freely and thus be out of engagement with the flange or cover plate. In such a case, the tie is not secured to the bridge or trestle as it should be. Not only could the tie be skewed, it is not held securely to the trestle. For this reason, the hook bolts in use today are quite objectionable. The invention obviates this objection by providing an improved hook bolt having at least one fin that is driven into the tie and positively maintains the hook bolt in the proper position during the life of the tie. It is, therefore, an object of the present invention to provide a hook bolt having at least one fin that may be driven into the tie to hold the hook bolt in proper position.

The hook bolt in use today is a relatively expensive article of manufacture because it must be forged. These hook bolts will usually cost about twenty cents a pound or more, depending on the number of hook bolts purchased at any one time. This is quite expensive since the major portion of the bolt is similar to an ordinary machine bolt that may be purchased for from three to four cents a pound. These hook bolts have a relatively short life because of the corrosion of the threads of the bolt by brine. This brine drips from refrigerating cars as the cars pass along the track. The brine will attack the threads and corrode them so that when force is applied to the nut used with the bolt, the bolt will break in two or the threads will break off. This usually means that the entire bolt must be thrown away. This is quite objectionable. The invention obviates this objection by providing a two piece hook bolt in which the threaded portion may be renewed whenever necessary. This has been found to decrease the initial cost of the hook bolt and considerably decrease the maintenance cost of the hook bolt. It is, therefore, an object of the present invention to provide a two piece hook bolt in which the threaded portion may be renewed or replaced whenever desired.

Other objects and advantages of the invention will appear from the drawing and accompanying description.

In the drawing and accompanying description, a preferred embodiment of the invention is shown and described, but it is to be understood that the drawing and description do not limit the invention and the invention will be defined by the appended claims.

In the drawing

Figure 1:
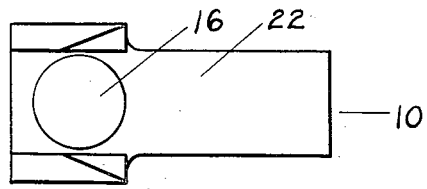
Fig. 1 is a plan view of a finned bearing member of the hook bolt provided by the invention.
Figure 2:
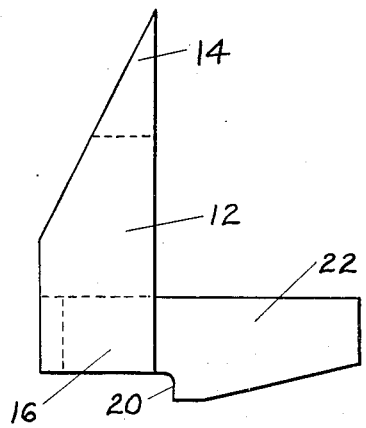
Fig. 2 is a side elevational view of the finned bearing member of the hook bolt shown in Fig. 1.
Figure 3:
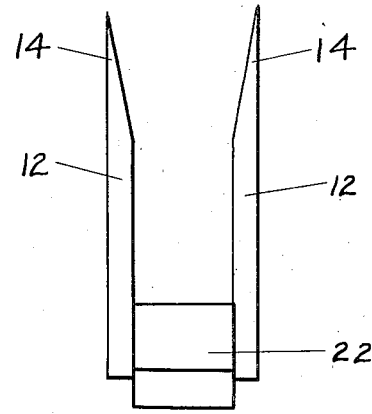
Fig. 3 is an end elevational view of the member shown in Fig. 1.
Figure 4:
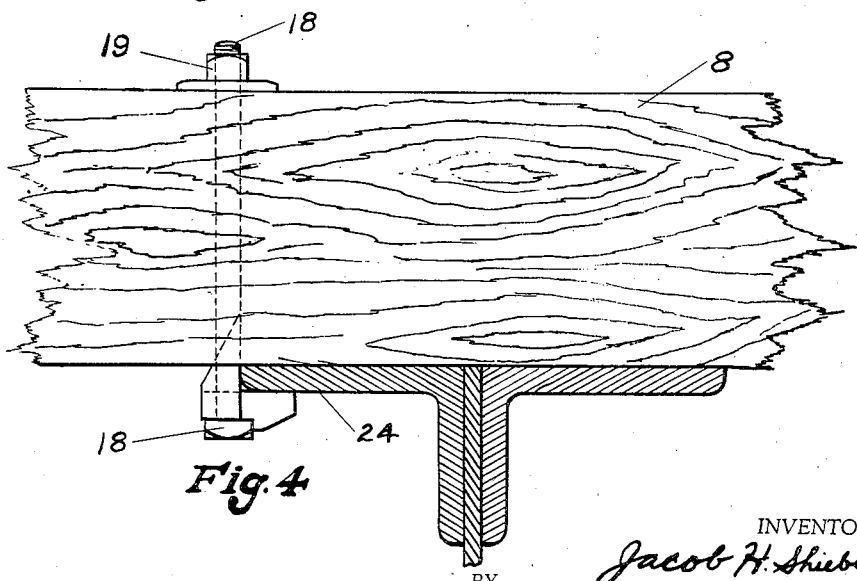
Fig. 4 is a side elevational view of a tie with which the hook bolt is used.

Referring to the drawing in detail, a finned bearing member of the hook bolt provided by the invention is denoted by the numeral 10. This member 10 bears against the flange of the girder on which the tie is supported. The bearing of member 10 against the flange of the girder prevents the movement of the tie relative to the girder. The hook bolt prevents any skewing of the tie on the bridge or trestle and maintains the tie in engagement with the bridge or trestle. The bearing member 10 may be made in a number of ways but is preferably made by casting. The member 10 may be made of any suitable material but it is preferably made of malleable iron or of steel so it has strength but is not brittle. The member 10 preferably has a pair of fins 12. These fins are relatively long and have pointed ends 14. The fins 12 are oppositely disposed relative to a hole 16 through the bearing. This hole 16 is dimensioned to receive a suitable machine bolt 18. The member 10 is provided with an edge 20 that engages the head of the machine bolt 18 and prevents the turning of the bolt relative to the member 10. The faces of the fins 12 define a plane that is perpendicular to the body portion 22 of the bearing member 10. The body portion 22 of the member 10 is adapted to extend under the flange of a girder as shown in Fig. 4.

The operation of the hook bolt is quite simple. The bearing member 10 is driven into the wood of a tie 8 until the fins 12 are securely held by the wood. The bearing member 10 is so positioned with relation to the hole through the tie 8 that a fin 12 is held in the wood on each side of the hole in the tie, and the hole 16 in member 10 is in register with the hole in the tie 8. The body portion 22 of the bearing member 10 extends under the flange 24 of the girder, and the faces of the fins 12 engage the face of the flange 24. The positioning of the body portion 22 of bearing member 10 under the flange 24 of the girder, keeps the tie 8 in engagement with the girder. The engagement between the faces of the fins 12 and the faces of the flanges 24, keeps the ties in proper alignment and prevents skewing of the ties. The machine bolt that is placed in the hole in the tie 8 and is drawn up securely by a nut 19, holds the bearing member to the tie 8. If and when the machine bolt 18 is rusted by brine or rain water and must be replaced, it is driven out of the tie and a new machine bolt 18 is used. This requires the replacement only of the machine bolt which is the least expensive part of the hook bolt. If the tie rots and must be replaced, the machine bolt is removed, the bearing member is swedged out of engagement with the tie and the two parts used with a new tie. If the bearing member or the machine bolt is not in good shape, it may be replaced quite easily. This obviates the replacing of the entire hook bolt.

Whereas the drawing and accompanying description have shown and described a preferred embodiment of the invention, it is obvious to those skilled in the art that various changes may be made in the form of the invention without changing the scope of the invention.

What I claim is:

1. An improved hook bolt that is adapted to secure railway ties to structures, comprising a bearing member and a machine bolt, said bearing member having a body portion, an opening through the said body portion and a pair of tie-penetrating fins that are integral with and project from said body portion, said fins being adjacent one end of said body member and being perpendicular to said body portion, said fins being appreciably higher than they are long and being appreciably longer than they are wide, said fins being of substantially uniform width throughout the major portion of their height and being of uniformly decreasing width for the rest of their height, said major portions of uniform width being adjacent the body portion of said bearing member, said fins being oppositely disposed of the opening of said opening through said body portion whereby said fins are spaced apart a distance at least as great as the diameter of said opening and whereby a gap is provided at said end of said bearing member, said fins having relatively sharp ends, said fins being substantially parallel to each other and having one of their surfaces parallel to the major axis of the railway tie, said fins constituting the sole tie-penetrating means of the bearing member, said body portion having an edge that is adapted to engage the head of the said machine bolt and prevent rotation of the bolt relative to the body portion of the bearing member, said edge and said fins being oppositely disposed relative to the said body member, said opening through the body portion of the bearing member being dimensioned to receive the said machine bolt, said sharp ends of the fins facilitating the driving of the fins into the railway tie, said fins having faces that define a plane substantially perpendicular to the axis of the body portion, said faces being adapted to engage the structure and prevent skewing of the tie, said body portion of the bearing member being adapted to engage an under portion of the structure and maintain the tie and the structure in assembled relation.

2. An improved hook bolt that is adapted to secure railway ties to structures, comprising a bearing member and a machine bolt, said bearing member having a body portion, an opening through the said body portion and a pair of tie-penetrating fins that are integral with and project from said body portion, said fins being perpendicular to said body portion, said fins being appreciably higher than they are long and being appreciably longer than they are wide, said fins being of substantially uniform width throughout the major portion of their height and being of uniformly decreasing width for the rest of their height, said major portions of uniform width being adjacent the body portion of said bearing member, said fins being oppositely disposed of the opening of said opening through said body portion whereby said fins are spaced apart a distance at least as great as the diameter of said opening, said fins having relatively sharp ends, said fins being substantially parallel to each other and having one of their surfaces parallel to the major axis of the railway tie, said fins constituting the sole tie-penetrating means of the bearing member, said body portion having an edge that is adapted to engage the head of the said machine bolt and prevent rotation of the bolt relative to the body portion of the bearing member, said edge and said fins being oppositely disposed relative to the said body member, said opening through the body portion of the bearing member being dimensioned to receive the said machine bolt, said sharp ends of the fins facilitating the driving of the fins into the railway tie, said fins having faces that define a plane substantially perpendicular to the axis of the body portion, said faces being adapted to engage the structure and prevent skewing of the tie, said body portion of the bearing member being adapted to engage an under portion of the structure and maintain the tie and the structure in assembled relation.

JACOB H. SHIEBER.